Aug. 27, 1957  A. W. GAUBATZ  2,804,526
CONTROL APPARATUS

Filed Feb. 8, 1954  2 Sheets-Sheet 1

INVENTOR
Arthur W. Gaubatz
BY Paul Fitzpatrick
ATTORNEY

Aug. 27, 1957  A. W. GAUBATZ  2,804,526
CONTROL APPARATUS

Filed Feb. 8, 1954  2 Sheets-Sheet 2

INVENTOR
Arthur W. Gaubatz
BY
Paul Fitzpatrick
ATTORNEY

United States Patent Office 2,804,526
Patented Aug. 27, 1957

2,804,526

CONTROL APPARATUS

Arthur W. Gaubatz, Indianapolis, Ind., assignor to General Motors Corporation, Detroit, Mich., a corporation of Delaware Application February 8, 1954, Serial No. 408,798

11 Claims. (Cl. 200—153)

This invention relates to control apparatus and more particularly to an operating and supporting arrangement for switches and the like.

It is desirable in many types of apparatus that a switch or other control device be operated by the rotation of a shaft. As an example, it is sometimes desirable in jet engine arrangements to operate certain control switches, such as afterburner switches and fuel supply switches, by the engine fuel control operating shaft. This shaft extend across the walls of the intake duct of the engine and is mounted thereon for rotation. The shaft is necessarily so mounted as to permit slight relative shifting to occur between the shaft and the supporting walls because the thermal expansion of the inner wall differs from that of the outer wall, and because some flexing of the annular duct may occur during flight. Prior to the invention, the control switches were mounted directly on the inner or outer wall and were actuated by cam portions of the shaft by means of levers or the like pivoted to the wall. Precise operation of the switches, although desired, was unattainable by such prior construction due to angular and axial shifting between the shaft and the wall supported switching apparatus.

An object of the invention is to provide an arrangement whereby a switch or other control device may be precisely operated by a shaft that is subject to misalignment relative its supporting framework.

A further object of the invention is to provide an arrangement whereby a shaft and its supporting framework may shift slightly relative each other without affecting the operation of a switch or like device that is operated by rotation of the shaft.

The objects of the invention are accomplished by mounting the switch directly on the shaft rather than on the supporting framework and by providing the switch with a connection to the framework that prevents rotation of the switch with the shaft but permits relative movement between the shaft and framework.

Further objects and advantages of the present invention will be apparent from the following description, reference being had to the accompanying drawings, wherein a preferred form of the present invention is clearly shown.

Figure 1:
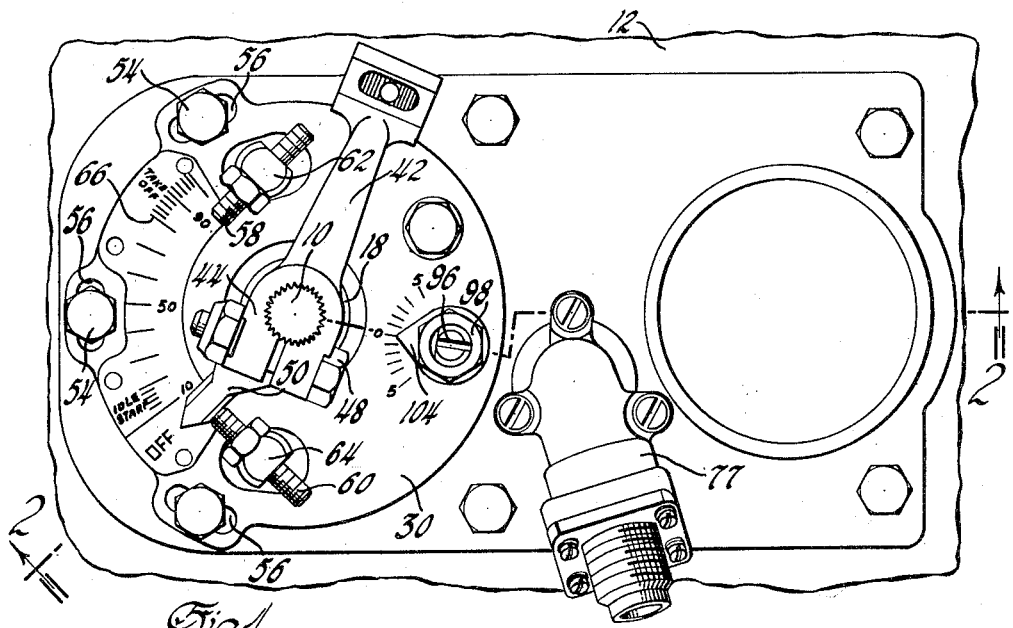
Fig. 1 is an external, horizontal, partial plan view of a jet engine intake duct having a fuel control arrangement thereon in accordance with the invention.
Figure 2:
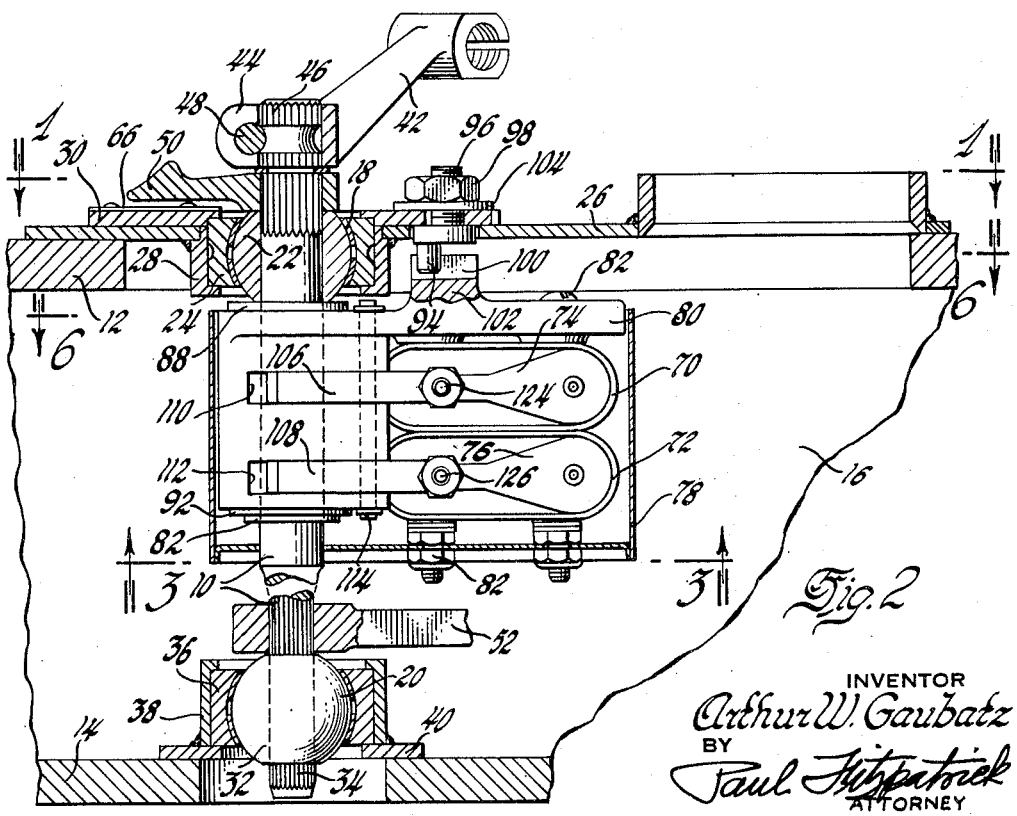
Fig. 2 is a vertical section taken substantially on the plane indicated by the line 2—2 of Fig. 1.
Figure 3:
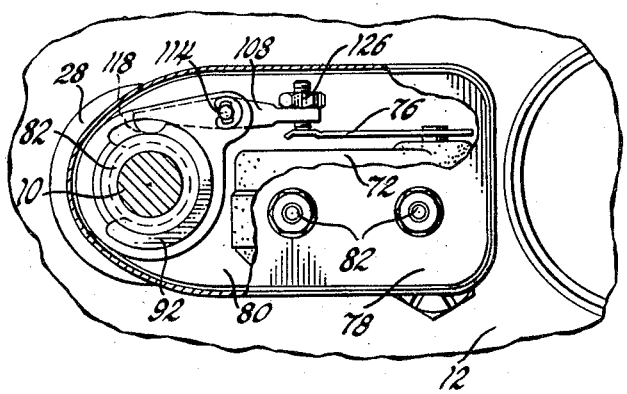
Fig. 3 is a horizontal section taken substantially on the plane indicated by the line 3—3 of Fig. 2.
Figure 4:
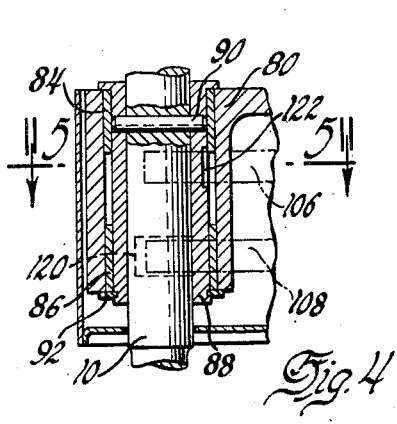
Fig. 4 is a vertical section taken substantially on the plane indicated by the line 4—4 of Fig. 6.
Figure 5:
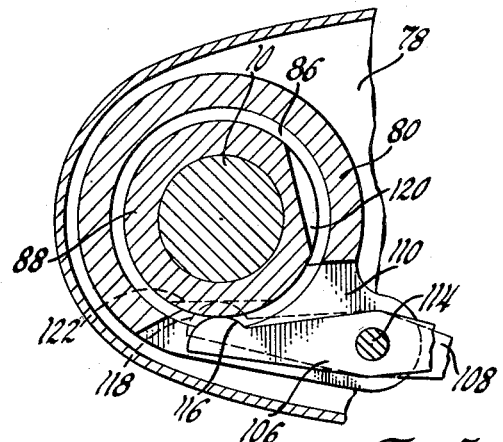
Fig. 5 is a horizontal section taken substantially on the plane indicated by the line 5—5 of Fig. 4.
Figure 6:
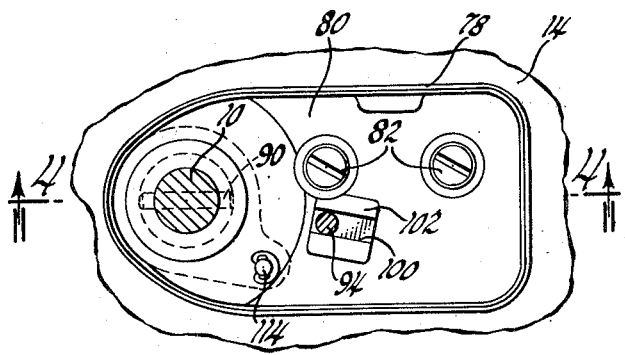
Fig. 6 is a horizontal section taken substantially on the plane indicated by the line 6—6 of Fig. 2.

Referring now to the drawings, a throttle control shaft 10 is supported by the outer and inner walls 12 and 14 of the annular intake duct 16 of a jet engine through spherical bearings 18 and 20. The spherical bearing 18 comprises a ball 22 slidable axially relative to the shaft 10 and pivotally supported by a socket 24 secured to a cover plate 26 on the outer wall 12 by a cup 28 and an index plate 30. The spherical bearing 20 comprises a ball 32 slidable axially on the splines 34 of the shaft 10 and pivotally received in the socket 36 secured to the inner wall 14 by a cup 38 and plate 40. A manual or input control lever 42 is adjustably mounted on the upper end of the control shaft 10 by means of a clamp portion 44 received by the splines 46 of the shaft and tightened thereon by a bolt 48. A pointer arm 50 is also splined to the upper end of the shaft while a fuel control or output lever 52 is splined to the lower end of the shaft. Bolts 54 secure the index plate 30 to the outer wall 12 through elongated slots 56 in the index plate which permit slight rotational adjustment between the plate and the wall.

The control shaft 10 is rotatable on movement of the lever 42 between the limits imposed by the threaded studs 58 and 60 supported on the index plate 30 by brackets 62 and 64. The index plate 30 carries an index scale 66 which provides a visual indication of the shaft positioning relative to the other components of the fuel system. As may be seen in Fig. 1, the engine fuel control shaft 10 may be moved to various positions including off, start, idle and take-off. The ball and socket mountings 18 and 20 of the shaft 10 to the duct walls 12 and 14 and the slidable connection between the shaft 10 and the balls 22, 32 permit the walls 12 and 14 to shift slightly relative to each other in any direction without deforming or binding the shaft thereby assuring free rotation of the same and positive operation of the fuel control device.

It is desirable that the rotation of the shaft 10 be utilized as a means to precisely operate one or more Microswitches 70 and 72 which are used to control various components of the jet engine, such as the afterburner or the exhaust nozzle actuator. The Microswitches 70 and 72 are of conventional form and include spring biased levers 74 and 76. Electrical connection to the switches is established through a conventional connector plug 77. The Microswitches 70, 72 and a switch casing 78 are secured to a switch support 80 by bolts 82. The switch support 80 is bored for the reception of bushings 84 and 86 which journal the same on the shaft 10 by means of a sleeve 88 secured to the shaft by a pin 90. A C-ring 92 secures the switch support 80 against axial movement along the shaft 10.

The switch support 80 is secured against rotation with the shaft by an eccentric cam finger 94 of a stud 96 adjustably secured to the index plate 30 by a nut 98. The cam finger 94 is slidably received in a slot 100 cut in a boss 102 of the switch support 80. A pointer 104 may be secured to the stud 96 to cooperate with reference characters on the index plate 30 to provide a visual indication of the position of the switch support. A pair of switch actuating levers 106 and 108 are received in slots 110 and 112 in the switch support 80 and are pivotally supported therein by a pin 114. The ends 116 and 118 of the actuating levers 106 and 108 ride on the shaft sleeve 88 which is provided with cam surfaces 120 and 122 to operate the switches at the proper rotational position of the shaft. The opposite ends of the actuating levers 106, 108 are provided with adjusting screws 124 and 126 which bear against the Microswitch levers 74 and 76 to operate the same.

From the foregoing it is apparent that the invention provides a means whereby the Microswitches 70 and 72 are precisely operated by the shaft 10 even though the shaft shifts slightly relative to its supporting walls 12 and 14. This is accomplished by mounting the switches 70 and 72 on the shaft 10 rather than on the walls 12, 14 and by restricting the mechanical connection between the walls and the switch to the finger and slot connection 94, 100 that ties the switches against rotation with the shaft. Operation of the switches is then dependent only upon the rotation of the shaft relative to the wall 12 and is independent of relative shifting between the wall and shaft.

While the preferred embodiment of the invention has been described fully in order to explain the principles of the invention, it is to be understood that modifications of structure may be made by the exercise of skill in the art within the scope of the invention which is not to be regarded as limited by the detailed description of the preferred embodiment.

I claim:

1. Apparatus comprising a first support, a shaft mounted for rotation on the first support, the shaft being so mounted as to permit relative shifting to occur between the shaft and the first support, a second support mounted on the shaft for relative rotation thereon, the second support being so mounted as to prevent relative shifting between the second support and the shaft, a connection between the first support and the second support that prevents the second support from rotating with the shaft while permitting the relative shifting between the shaft and the first support to take place, and a control device mounted on the second support including means actuated by rotation of the shaft.

2. Apparatus as claimed in claim 1 wherein the shaft is mounted on the first support by a ball and socket connection.

3. Apparatus as claimed in claim 1 wherein the connection between the first support and the second support comprises a pin and slot connection.

4. Apparatus as claimed in claim 1 wherein the control device comprises a switch.

5. Apparatus as claimed in claim 1 wherein the shaft is mounted on the first support by a ball and socket connection and wherein the connection between the first support and second support is a pin and slot connection.

6. Apparatus as claimed in claim 1 wherein the shaft is mounted on the first support by a ball and socket connection and wherein the control device comprises a switch.

7. Apparatus as claimed in claim 1 wherein the connection between the first support and the second support comprises a pin and slot connection and wherein the control device comprises a switch.

8. Apparatus comprising a first support, a shaft mounted for rotation on the first support by a ball and socket connection that permits axial and pivotal movements to occur between the shaft and the first support, a second support mounted on the shaft for relative rotation thereon, the second support being so mounted as to prevent other than rotational movement to occur between the second support and the shaft, a pin and slot connection between the first support and the second support that prevents the second support from rotating with the shaft while permitting the movements between the shaft and the first support to take place, and a switch mounted on the second support including means actuated by rotation of the shaft.

9. Apparatus as claimed in claim 8 wherein the connection between the first support and the second support is adjustable so that the second support may be rotated relative to the shaft.

10. Apparatus as claimed in claim 8 wherein the shaft is provided with a cam surface and wherein the switch is operated by a lever pivoted to the second support for engagement with the cam surface of the shaft.

11. Apparatus comprising a first wall and a second wall spaced from each other and so arranged as to move slightly in any direction relative to each other, a shaft having a cam surface thereon and mounted for rotational, pivotal, and axial movement on said walls by ball and socket connections that permit the movements between the walls to occur, a switch mounted on the shaft for relative rotational movement thereon and having an operating member engageable with the cam surface of the shaft, and means connecting the switch to one of the walls that prevents the switch from rotating with the shaft but permits movements between the switch and the wall to take place.

References Cited in the file of this patent

UNITED STATES PATENTS

| | | |
|---|---|---|
| 2,468,974 | Hammer | May 3, 1949 |
| 2,595,621 | West et al. | May 6, 1952 |
| 2,609,075 | Schulder | Sept. 2, 1952 |